United States Patent [19]
Dean, II et al.

[11] Patent Number: 5,244,479
[45] Date of Patent: Sep. 14, 1993

[54] LIQUID/GAS SEPARATOR FOR SOAPY LIQUID

[75] Inventors: Walter C. Dean, II, Simsbury; Arthur M. Leclair, So. Windsor, both of Conn.

[73] Assignee: United Technologies Corporation, Hartford, Conn.

[21] Appl. No.: 31,803

[22] Filed: Mar. 15, 1993

[51] Int. Cl.$^5$ .............................................. B01D 45/12
[52] U.S. Cl. ................................... 96/174; 55/213; 55/270; 55/409; 96/177
[58] Field of Search ................ 55/1, 52, 55, 87, 178, 55/182, 199, 201, 203, 204, 206, 207, 213, 270, 405, 409, 459.1

[56] References Cited

U.S. PATENT DOCUMENTS

| | | |
|---|---|---|
| 3,501,414 | 3/1970 | Mueller .................. 55/178 |
| 4,113,452 | 9/1978 | Brown et al. ............ 55/409 X |
| 4,600,413 | 7/1986 | Sugden .................. 55/207 |
| 4,604,109 | 8/1986 | Koslow .................. 55/52 |
| 4,645,517 | 2/1987 | Hagen et al. ............ 55/182 |

Primary Examiner—Charles Hart
Attorney, Agent, or Firm—Norman Friedland

[57] ABSTRACT

The liquid/gas separator for soapy water consists of a fixed cylindrical housing defining a fixed chamber for supporting a rotating shaft supported about the longitudinal axis. A preswirl chamber communicating with the main chamber in which are disposed parallely spaced annular coalescing disks supported to the rotating shaft, serves, with the preswirl chamber, to rotate the centrifuged water to form a water ring adjacent the outer wall of the chamber and flows the gas through a central passage formed in the shaft along the longitudinal axis to be vented in response to a control valve located at the open end of the shaft remote from the preswirl chamber. Control means responsive to the differential of the static pressure of the water ring and the gas pressure, control the venting of the gas. Additional control means are included for high and low level settings to provide override information for control of the judiciously located solenoid valve for the venting of the gas in the liquid/water separator and for override in the system utilizing the liquid/gas separator.

19 Claims, 3 Drawing Sheets

LIQUID/GAS SEPARATOR FOR SOAPY LIQUID

TECHNICAL FIELD

This invention relates to liquid/gas separators adapted for use in a zero-gravity field and particularly to a phase separator that separates gas from soapy water.

BACKGROUND ART

Since the advent of orbiting spacecraft that operates in a zero gravity ("g") environment there has existed a need to separate gas from liquid and particularly where the liquid is water. As is well known in this field of technology, the development of water/gas separators has been substantially successful, in fact, some units have evidenced success rates that have removed 100% of the gas from the treated water. Of course, it is abundantly important that the water which may be used in a pumping system and the like is free from air bubbles.

Typically, these prior art separators utilize a rotating drum to separate and collect the liquid and use a pitot tube to remove the collected liquid from the drum. Other types of separators use rotating paddles and coalescers instead of the rotary drum. The paddles serve to maintain a swirling mass of liquid inside of a circular housing manifesting the separation of the liquid/gas interface in a zero "g" or variable "g"' environment. The coalescer is typically fabricated from a wire mesh which is porous to the flowing air/water stream and serves to coalesce the minute water droplets into larger water drops so as to be in a form that is readily collectable. Coalescer material is disclosed, for example, in U.S. Pat. No. 3,339,349 granted to R. F. Farnum on Aug. 28, 1964 which patent is commonly assigned to United Technologies Corporation and incorporated herein by reference.

While the later described liquid/water separator has been extremely efficacious and has exhibited no carry over in the gas vent stream when operating on clean, non-soapy water, it has proven less than efficacious when soap or the like is contained in the liquid being treated. In fact in actual tests of the water/gas separator of the type using paddles, the soap allowed the formation of fine bubbles in the liquid as the paddles rotate the water ring inside the fixed housing. This resulted in carry over in the water in the form of fine bubbles. Additionally, foam formed in the air at the center of the separator adversely affected the coalescer function and in fact, defeated it. Because this occurs at the spinning screen of the coalescer adjacent the rotating axis, the gas vent evidenced the formation of foam. The carry over in the water in the form of fine bubbles and in the gas vent in the form of foam are entirely unacceptable conditions.

We have found that we can obviate the problems enumerated in the above paragraphs by providing an improved coalescer, eliminating the paddles, utilizing other means for rotating the water ring inside the fixed housing, improved venting and controlling means.

SUMMARY OF THE INVENTION

An object of this invention is to provide an improved liquid/gas separator that can operate under zero "g"' or variable "g" environment.

A feature of this invention is to provide a housing defining a fixed chamber with rotating disks serving as a means to impart rotary motion to a ring of liquid adjacent to the cylindrical wall in the fixed chamber. These disks also serve as a coalescers. The housing includes a pre spin chamber at the inlet.

A still further feature of this invention is the provision of means for venting collected gas at the center line of the water/gas separator cylindrical fixed housing.

A still further feature of this invention is providing means for preventing bio-fouling of the water used in the sensing process by the continuous flow of the water being sensed and recirculating it back to the inlet without affecting the vent gas flow.

A still further feature of this invention is the use of a separate vent override solenoid valve that is closely coupled to the control vent valve.

A still further feature of this invention is the use of a pre-set spring load piston with a pair of magnetic switches to override the liquid/gas separator and system controls.

The foregoing and other features of the present invention will become more apparent from the following description and accompanying drawings.

BEST MODE FOR CARRYING OUT THE INVENTION

Figure 1:
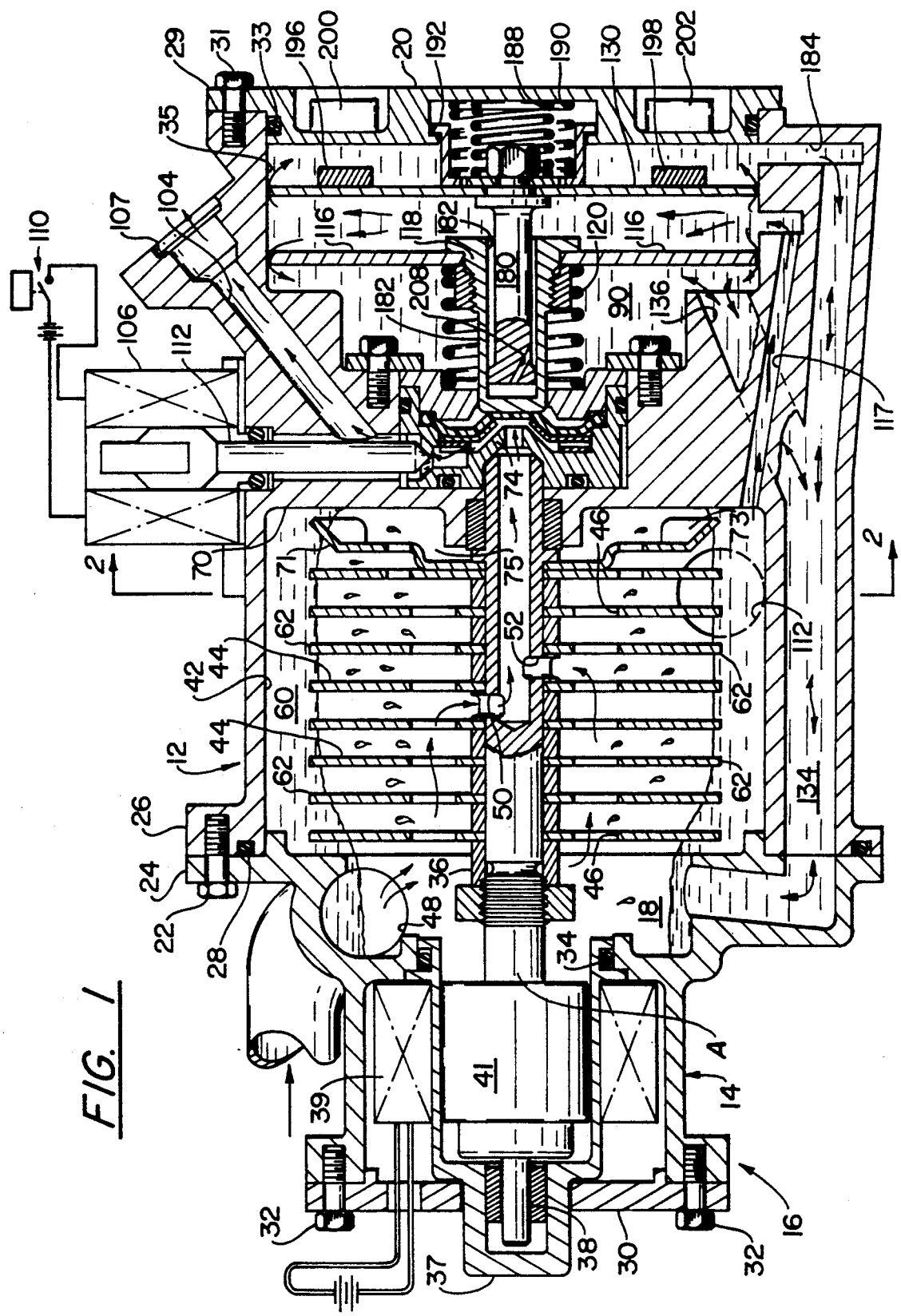
FIG. 1 is a sectional view taken along the central axis of the moisture separator for illustrating the details of this invention.

While this invention in its preferred embodiment is described as being utilized to separate air from soapy water in a zero or variable "g" environment, it is to be understood, as one skilled in this art will appreciate, this invention can be used to separate other liquid/gas combinations and in other environments, particularly for vehicles that operate at different attitudes. This invention can best be understood by referring to the preferred embodiment depicted in FIGS. 2 and 3 which are sectional views taken through the longitudinal axis and transverse plane showing the water/gas separator generally illustrated by reference numeral 10 being comprised of an open ended cylindrical housing 12 closed at one end by housing 14 supporting motor 16 which defines the preswirl chamber 18 and closed at the other end by end cap 20.

Figure 2:
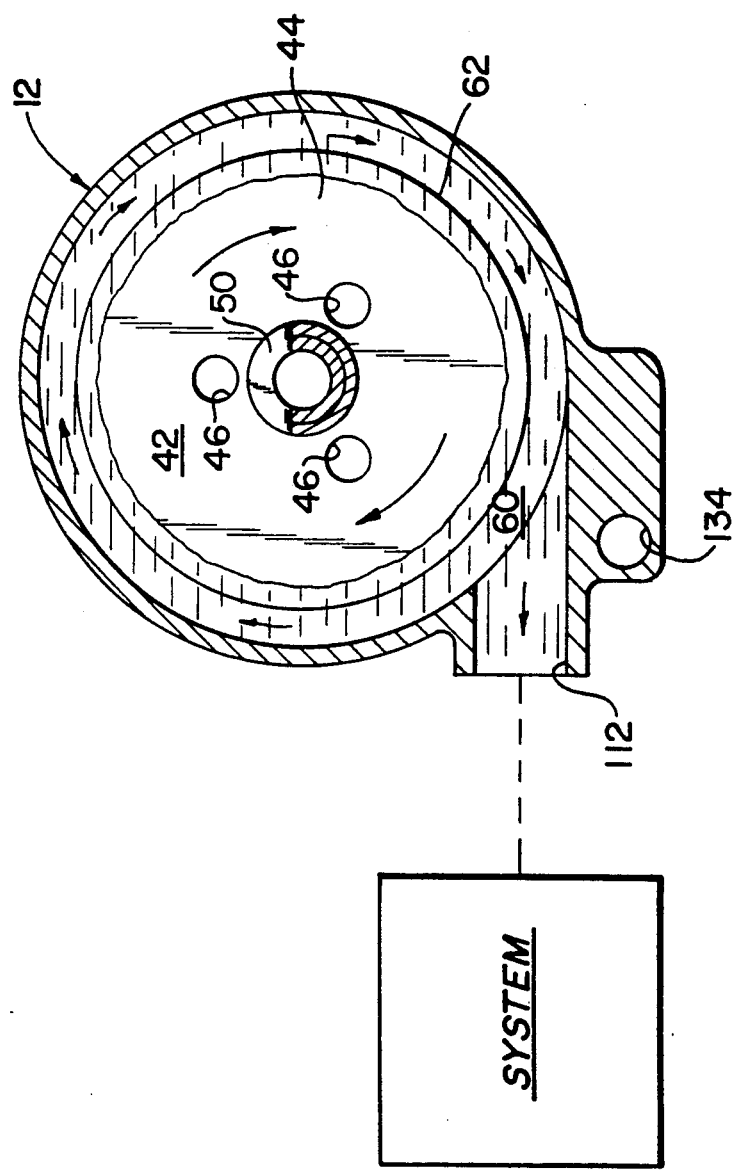
FIG. 2 is a sectional view taken along lines 2—2 of FIG. 1.
Figure 3:
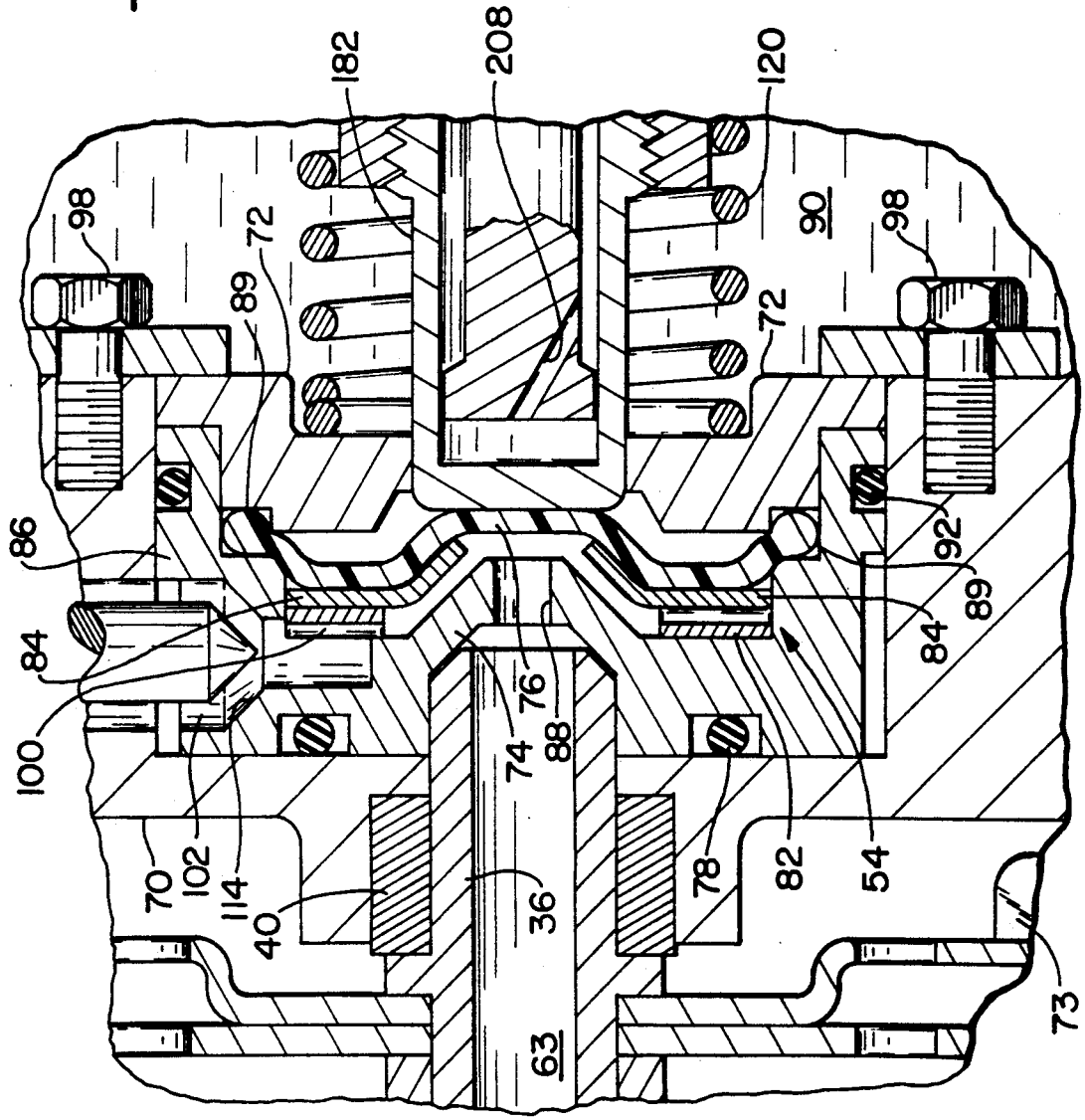
FIG. 3 is a partial enlarged view in section showing the vent valve mechanism of FIG. 1.

As shown in FIGS. 1-3, the left end of cylindrical housing 12 is fitted to the end of cylindrical housing 14 by a plurality of bolts 22 (one being shown) attaching the complementary flanges 24 and 26 together and being sealed by O-ring 28. The other end of cylindrical housing 14 is sealed off by end cap 20 attached thereto at flange 29 by a plurality of bolts 31 (only one being shown). An O ring 33 seals chamber 35 and prevents the escapement of gas and water. The end of cylindrical housing 14 is closed off by end plate 30 by a plurality of bolts 32. Shell 37, held in position by plate 30, separates the stator 39 from rotor 41 of motor 16 and extends axially to the left hand end of preswirl chamber 18. O-ring 34 supported to the end of shell 37 seals the chamber housing electrical motor 16 from the water/gas mixture in the preswirl chamber 18. While in the preferred embodiment a D.C. motor is disclosed, it is to be understood that an A.C. motor can be equally utilized.

The central shaft 36 attached at one end to electrical motor 16 and driven thereby is supported at either end by journal bearings 38 and 40 and extends axially through the water/gas separator's cylindrical chamber 42. A plurality of axially spaced coalescer annular plates 44 are fixed at their centers to the rotating shaft 36 to rotate therewith and serve to generate a centrifugal field and coalesce the water film passing through the apertures 46. The spacing between adjacent plates serve to coalesce the water film and the centrifugal force serves to propel the water droplets to the outer wall of chamber 42. Coalescer plates 44 are made from a thin sheet of non-porous material (unlike the prior art coalescers), as for example, stainless steel and include a plurality of circumferentially spaced apertures 46 drilled therein located adjacent to or in proximity to shaft 36. As noted in U.S. Pat. No. 3,339,349, supra, the coalescing is effectuated by passing the gas and water mixture through the porous material and the interstices of the matrix serve to coalesce the mist or fine particles into larger droplets. In the present invention the plates are placed sufficiently close to effectuate coalescing. The distance between adjacent plates will be dependent on the particular application and can be readily determined by trial and error.

The preswirl chamber 18 includes an inlet port 48 that is oriented tangentially to the preswirl chamber 18 which serves to spin the water and centrifuge it the outer wall of chamber 18. The diameter of chamber 18 is chosen to be smaller than the diameter of chamber 42 to allow the centrifuged water ring to migrate to the outer wall of chamber 42. As will be explained in further detail hereinbelow the force imparted by the tangential flow of water/gas through the inlet port and the centrifugal field generated by the rotating coalescer plates 44 force the liquid to the outer wall of chamber 42 while the gas flows toward the center line A to be vented through the apertures into the shaft 36.

The central shaft 36 includes, at approximately its mid point, slots 50 and 52 for venting the gas through the central bore formed in shaft 36 to the end remote from the inlet port 48 which is opened to the level control valve generally indicated by reference numeral 54.

The main body of the water/gas separator is approximately 3.0 inches in the inside diameter and 2.0 inches long. The coalescer disks 44 extend radially outward to approximately 0.25 inches from the inside diameter of the cylindrical housing 12.

In operation, a mixture of water and air enters the preswirl chamber 18 through tangentially oriented inlet port 48 and is forced to spin around the housing centerline A and follows the inside surface of the housing 12. Initial separation occurs at the preswirl chamber 18 with the water moving toward the outer wall of chamber 42 and the air bubbles moving toward the center line A. The partially separated mixture then enters the chamber 42 adjacent disks 46 where the centrifugal action of spinning disks 46 forces the water to the outer wall of housing 12 forming a water ring 60 that is maintained in motion by the outer edges 62 of the spinning coalescer disks 44. The motor rotates at a range of say, between 1000 to 2400 RPM and in the preferred embodiment rotates at approximately 1200 RPM which, in turn, rotates shaft 36 and coalescer disks 46 at that speed. At the preferred shaft speed, water ring 60 rotates at an average speed of approximately 600 RPM as a result of the drag from the faster rotating coalescer disks 44.

Disk 71 is a modification of the other coalescer disks for reasons that will be understood from the description to follow. As noted from FIG. 1, disk 71 is located at the far right hand end of chamber 41 adjacent to the wall 70 and carries a plurality of circumferentially spaced vanes 73. Vanes 73 are radially oriented and act as paddles to assure complete expulsion of water from cavity 75 located adjacent to shaft journal bearing 40 by means of centrifugal force. This prevents liquid from leaking into the gas vent adjacent to the end of shaft 36 through the fit between bearing 40 and shaft 36.

The air moves toward the center line A and flows through apertures 46 in the coalescer disks 44 toward the slots 50 and 52 that connect to the central passageway 62 defined by shaft 36 which communicates with the level control valve 54 which will be described hereinbelow.

As is apparent from viewing FIGS. 1 and 3, the chamber 42 is formed within housing 12 and extends axially to approximately its mid point and the remaining portion includes the chambers to house the valving and the control mechanism. As noted, the housing 12 defines the annular wall 70 defining the bearing compartment for supporting bearing 40.

The level control valve 54 is disposed in a central bore 72 adjacent to the wall 70 in proximity to the end of shaft 36. Level control valve 54 consists of the conical seat 74 in fluid communication with the passageway 62 and the flexible diaphragm 76. O-ring 78 seals the chamber 42 from the control portion of the housing 12. Rectilinear motion of diaphragm 76 is effectuated by the control piston 80 and wave washer 82. Diaphragm 76 is supported on its left end by torus shaped plate 84 having a beveled inside diameter complementing the shape of the outer surface of the conical seat 74 which, in turn, is supported to the diaphragm support 86.

The gas vent chamber adjacent the aperture 88 of the conical seat 74 is sealed from the control chamber 90 by O-ring 92. Diaphragm 76 is clamped into place by the spring retainer 72 and the flexible and resilient bead 91 fitted into the annular groove formed in spring retainer 72. This assembly is attached to housing 12 by machine bolt and annular plate assembly 98.

When the level control valve is in the opened position, as presently shown in FIG. 1, the gas is vented through passage 100 defined between the diaphragm assembly and conical seat 74 and the drilled passages 102 and 104. The diaphragm and conical seat 84 are dimensioned so that metal to metal contact with the flat surface adjacent the valve port is avoided. As will be described in further detail herein below a suitable solenoid valve 106 is disposed in passage 102 and serves to shut-off the flow of gas from flowing into passage 104 and outlet port 107.

Solenoid valve 106 serves to override the vent function during start-up and to prevent overflow if the level control should malfunction by manually or automatically responding to various output signals in a well known manner as depicted schematically by the electrical circuit and switch illustrated by reference numeral 110. Actuation of the switch in the electrical circuit 110 causes the plunger 112 to seat on the seat 114 to close off the vent flow, as described. The location of the solenoid valve 106 relative to the control vent valve 54 not only simplifies the design of the water separator, but also makes it more effective.

The outlet for the water of the water/air separator is located adjacent to the inner wall of housing 12 in chamber 42. Outlet port 112 is in communication with the water ring 60 at the end remote from the preswirl chamber 18 and is tangentially oriented relative to the cylindrical chamber 42. It is desirable to exit the water tangentially so as to recover some of the pressure head established in the water/air separator.

The level of the water in the water ring 60 (radial distance from the housing 12) is maintained at the required level by the action of control valve 54 which, in turn, is controlled by the control piston 116. Control piston 116 is suitably attached to plunger 118 and bears against the diaphragm 76 with a force that is proportional to the height and spinning velocity of the water ring 60. The pressure of the water ring 60 is manifested in two ways. First, the height of the water ring 60 increases the pressure and second, as the water ring 60 protrudes radially inwardly past the edges 62 of disks 44, the increase engagement with edges 62 of disks 44 cause the average rotational speed of water ring 60 to increase, and as a consequence, increasing the pressure of water ring 60. This difference in velocity imparts an increase in pressure of the water ring. The static pressure of the water ring is sensed by the right hand face of control piston 116.

In the preferred embodiment, static pressure is sensed by five (5) drilled passages (one being shown) of approximately 0.130 inches in diameter located in close proximity to each other and all being in communication with the outer diameter of the spinning water ring 60. The staic pressur creates a force on piston 116 which is counteracted by the force generated by the gas pressure acting on the opposite face of the control piston 116 and balanced by the force created by helical spring 120 seated in spring retainer 72.

It will be appreciated that the gas pressure acting on the opposite face of the control piston 116 is equal to, or sufficiently so, the pressure at the swirl chamber 18. Inasmuch as drilled passages 134 and 136 communicate with preswirl chamber 18, the pressure existing in the cavity on the left hand side of piston 116 is essentially gas pressure.

As is apparent from the foregoing, the left side of control piston 116 sees gas pressure sensed at the preswirl chamber 18 through drilled passages 134 and 136. The right side of the piston sees the static pressure of the outer diameter of the water ring 60 sensed by the five (5) drilled passages 117. As the water level increases, the static pressure at the outer diameter increases with respect to the center line pressure due to increased depth and due to increased rotational velocity resulting from greater contact area on the rotating on the edges 62 of disks 44. The pressures acting over the respective areas of diaphragm 76 creates a force difference. This force differential is balanced by the force exerted by spring 120 for determining the position of vent valve 54 to control the venting of the air through the air outlet port 105.

Wave washer 82, which bears against the left hand face of torus shaped support 84 serves to urge the diaphragm 76 off the conical seat when the valve is in the closed position at low gas pressures.

The same pressure differential acting across control piston 116 acts across sensor piston 130 that is connected to the concentrically mounted springs 188 and 190. The spring arrangement preloads the sensor piston 130 that allows sensor piston motion at predetermined high and low level settings. Sensor piston 130 is disposed in the center bore of housing 12 and is coaxial to and parallelly spaced from control piston 116. As noted, piston 130 is centrally supported to plunger 118 via the plunger 180 that fits into recess 182. The right hand side of sensor piston 130 sees gas pressure sensed via passage 184 and drilled passage 134 and the left hand side of sensor piston sees the static pressure of water ring 60 which is present in the cavity adjacent the left side of sensor piston 130.

Springs 188 and 190 seated in spring retainers 192 and 194 serve to allow the upper half of piston 130 to move toward the right and the lower half of sensor piston to move toward the left as viewed in FIG. 1. Suitable Hall sensors or other sensors, such as a magnetic reed switch, may be utilized to sense these minute changes to provide override signals. Hall sensors or magnetic position sensors 200 and 202 are utilized which sense the changes of the flux level of magnets 196 and 198 which are suitably attached to the upper and lower portion of the right face of sensor piston 130. The magnetic position sensors 200 and 202 cooperating with magnets 196 and 198, respectively, pick up these changes and either relay the signal to a suitable actuator to shut off the gas vent through solenoid 106 or cause the system to react by say, bypassing or shutting off the pump being driven by the water treated by the water/air separator.

To prevent bio-fouling problems occasioned by static water, the system insures that the water used in the control portion of the water/air separator 10 is continuously flowing. This is accomplished by the fit of the control piston 116 and the sensor piston 130 relative to the inner diameter of the bore in housing 12. The fit is such that liquid is allowed to leak around the pistons and return to the preswirl chamber 18 via passages 184, 136 and 134. The small amount of water that migrates in the recess 182 to the space at the end of plunger 180 is vented through the passage 208 and the annular space between plungers 180 and 118.

What has been shown by this invention is an efficient water/air separator for soapy water that through actual tests using amounts of gas ranging from 0 to 100% of gas in the soapy water/gas mixture, the apparatus constructed as described with an average of 10% gas in the water/gas mixture evidenced virtually no soap in the gas vent (>0.01%) and >0.4% air in the water outlet. What is deemed an improvement over heretofore known liquid/gas separators for use in a zero "g" environment, amongst others, are the following:

1. The use of a pre spin chamber at the inlet;
2. The use of a series of spinning disks to provide the rotation force to a water ring spinning inside of a fixed housing;
3. The use of a centerline valve arrangement to vent gas;
4. The sensing port connection to the inlet end of the separator housing to allow sensor piston discharge flow to be recycled without affecting vent flow;
5. The use of a separate vent override solenoid valve closely coupled to the control vent valve; and
6. The use of a pre-set spring load piston with magnetic switches for override control of both the separator and system utilizing the separator.

Although this invention has been shown and described with respect to detailed embodiments thereof, it will be appreciated and understood by those skilled in the art that various changes in form and detail thereof may be made without departing from the spirit and scope of the claimed invention.

We claim:

1. Means for separating air and water from a soapy water and air mixture including a fixed housing having a cylindrical wall defining a fixed annular chamber, a rotating shaft rotary supported in said chamber about a longitudinal axis, and a plurality of axially spaced annular coalescer disks supported to said shaft and radially extending adjacent to, but spaced from said cylindrical wall, preswirl means including an inlet to impart centrifugal motion to the soapy water and air mixture admitted thereto from said inlet communicating with said fixed annular chamber, said preswirl means and said annular coalescer disks centrifuging water from said soapy water and air mixture to form and rotate a ring of said centrifuged water adjacent said cylindrical wall, said coalescer disks coalescing a portion of said centrifuged water, vent means including apertures in said coalescer disks adjacent said longitudinal axis and a passage in said shaft remote from said preswirl means for venting the separated air, means to impart rotary motion to said shaft, regulating means responsive to operating conditions in said chamber to regulate the flow of air in said vent means, and a water outlet in said housing communicating with said water ring for discharging separated water.

2. Means for separating air and water as claimed in claim 1 wherein said means to impart rotary motion is an electrical motor.

3. Means for separating air and water as claimed in claim 2 wherein said coalescer disks are made from a metallic material impervious to air and water.

4. Means for separating air and water as claimed in claim 3 wherein said regulating means includes valve means for regulating the flow of gas through said passage and control means responsive to the differential pressure between the gas in said chamber and the pressure of said water ring for controlling said valve means.

5. Means for separating air and water as claimed in claim 4 including an operating system fluidly connected to said water outlet and override means responsive to the differential gas pressure in said chamber and the pressure of said water ring for controlling said override means for shutting off said vent means or shutting down said operating system.

6. Means for separating air and water as claimed in claim 5 including an electrically actuated solenoid valve disposed in proximity to said valve means and in fluid connection therewith, said override means includes switch means for actuating said solenoid means.

7. Means for separating air and water as claimed in claim 6 wherein said switch means includes a magnetic sensor.

8. Means for separating air and water as claimed in claim 7 wherein said override means includes additional switch means for deactivating said operating system.

9. Means for separating air and water as claimed in claim 8 wherein said additional switch means includes another magnetic sensor.

10. Means for separating air and water as claimed in claim 7 wherein said switch responds to one level of said pressure differential and said additional switch means responds to another level of said differential pressure.

11. Means for separating air and water as claimed in claim 5 wherein said control means includes a moveable member having one surface responding to the pressure of said gas in said chamber and an opposing surface responding to static pressure of said water ring and a plunger attached to said moveable member for positioning said valve means.

12. Means as claimed in claim 11 including a plurality of small diameter passages in close proximity to each other for leading water in said water ring to said moveable member.

13. A liquid/gas separator for soapy water including a fixed housing having cylindrical wall means defining an open ended chamber, a shaft centrally supported for rotary motion about the longitudinal axis of said chamber and having a central passage opened at one end formed therein, a preswirl chamber adjacent to one end of said open ended chamber including an inlet for admitting the liquid/gas mixture into said preswirl chamber with a tangential velocity, a plurality of axially spaced annular coalescer disks supported to said shaft for rotation therewith extending radially and slightly spaced from said cylindrical wall means for centrifuging said liquid to define a liquid ring adjacent said cylindrical wall means and imparting rotary motion to the liquid ring and coalescing the liquid, venting valve means cooperating with said shaft for regulating the venting of gas separated from said liquid/gas mixture by flowing said gas through apertures located in said coalescer disks adjacent said longitudinal axis, through apertures formed in said shaft, through said passage in said shaft and through said valve means, control means on one end of said open ended chamber responsive to the differential gas pressure and liquid pressure in said cylindrical chamber, means on the other end of said open ended chamber for imparting rotary motion to said shaft, and liquid removal means communicating with said water ring for removal of liquid.

14. A liquid/gas separator as claimed in claim 13 wherein the liquid is water and the gas is air.

15. A liquid/gas separator as claimed in claim 14 wherein said coalescer disks are made from a non-porous material.

16. A liquid/gas separator as claimed in claim 15 wherein said control means include a laterally disposed piston in a cavity formed in said housing, said piston defining subchambers and having opposing surfaces, one of said surfaces being subjected to the pressure of said gas and the other of said surfaces being exposed to the static pressure of said liquid ring.

17. A liquid/gas separator as claimed in claim 16, said liquid/gas separator supplying liquid to a system, said liquid/gas separator including override control means having an additional piston parallelly disposed relative to said piston in said chamber, said additional piston having one surface subjected to the pressure of said gas and the an second opposing surface subjected to the static pressure of said liquid ring for providing an override signal, and means responsive to said override signal to override operation of said liquid/gas separator or said system.

18. A liquid/gas separator as claimed in claim 17 wherein said piston includes leakage adjacent the edges of said piston and said additional piston to provide continuous flow in said cavity and said subchambers.

19. A liquid/gas separator as claimed in claim 18 wherein the annular coalescer disk adjacent said venting valve means includes a plurality of vanes radially disposed relative to said shaft for centrifuging water away from said venting valve means.

* * * * *